(12) United States Patent
Hitomi et al.

(10) Patent No.: US 6,209,816 B1
(45) Date of Patent: Apr. 3, 2001

(54) MECHANICAL ASSEMBLY WITH INCOMPATIBLE METALLIC MATERIALS

(75) Inventors: Yasuhiro Hitomi, Hashimoto; Ken'ichi Kawasaki, Sakai; Yasushi Nishimura, Izumi, all of (JP)

(73) Assignee: Shimano Inc., Sakai (JP)

( * ) Notice: Subject to any disclaimer, the term of this patent is extended or adjusted under 35 U.S.C. 154(b) by 0 days.

(21) Appl. No.: 09/206,243

(22) Filed: Dec. 7, 1998

(30) Foreign Application Priority Data

| Dec. 10, 1997 | (JP) | 9-340204 |
| Dec. 10, 1997 | (JP) | 9-340205 |
| May 26, 1998 | (JP) | 10-144658 |

(51) Int. Cl.⁷ .................................................. A01K 89/015
(52) U.S. Cl. ...................... 242/322; 242/310; 242/900; 428/649; 428/933
(58) Field of Search .................... 428/933, 653, 428/649, 685, 659; 242/900, 310, 322

(56) References Cited

U.S. PATENT DOCUMENTS

| 2,478,478 | * | 8/1949 | Grebe . |
| 3,629,091 | * | 12/1971 | George . |
| 3,830,634 | * | 8/1974 | Zaremski et al. . |
| 5,449,563 | * | 9/1995 | Zhang . |
| 5,454,628 | | 10/1995 | Maiworm et al. . |

FOREIGN PATENT DOCUMENTS

| 2 207 771 | 8/1973 | (DE) . |
| 43 06 484 | 4/1994 | (DE) . |
| 57-054281 | 7/1982 | (JP) . |
| 5-125567 | 5/1993 | (JP) . |
| 5-190023 | 7/1993 | (JP) . |
| 10-204665 | 8/1998 | (JP) . |
| 10-236101 | 12/1998 | (JP) . |
| 94/04379 | 3/1994 | (WO) . |

\* cited by examiner

Primary Examiner—Katherine A. Matecki
(74) Attorney, Agent, or Firm—Shinjyu Intellectual Property Firm

(57) ABSTRACT

Various parts in an assembly of parts are made of differing metals having incompatible ionization characteristics. Any two parts which have incompatible ionization characteristics are separated from one another such that corrosion inducing contact therebetween is eliminated. Therefore, the possibility of electrolytical corrosion can be reduced. For example, in one embodiment a spool assembly in a spinning reel includes a spool (12) made of a magnesium alloy mounted on a spool shaft (16). The spool shaft (16) is made of a stainless steel. Stainless steel and the magnesium alloy have ionization characteristics that are not compatible, leading to possible electrolytic corrosion therebetween. However, a sleeve (20) is disposed between the spool (12) and spool shaft (16). The sleeve (20) is made of an aluminum alloy that has ionization characteristics that are compatible with both the magnesium alloy and stainless steel.

13 Claims, 12 Drawing Sheets

MECHANICAL ASSEMBLY WITH INCOMPATIBLE METALLIC MATERIALS

BACKGROUND OF THE INVENTION

A. Field of the Invention

The present invention relates to an assembly and in particular to an assembly made up of a plurality of parts made of materials having non-compatible ionization characteristics. The assembly may be used in a variety of mechanisms such as fishing reels and bicycle related mechanisms.

B. Description of the Related Art

Fishing reels that are configured to be mounted on a fishing rod for winding a fishing line may be divided into three general categories of reels: spinning reels; double bearing reels; and one-sided bearing reels. Such fishing reels usually include a reel main body to be mounted onto a fishing rod, and a spool mounted on the reel main body for winding a fishing line. In the double bearing reels and the one-sided bearing reels and spool are rotatably supported by the reel main body. Also, in the spinning reels, a spool is configured to move along an axis of the spool in forward and backward directions and is mounted onto the reel main body. Portions of the reel main body, the spool or the like of the fishing reel of each of the above mentioned types of fishing reels are generally made of an aluminum alloy, a synthetic resin, or the like, for the weight reduction purposes.

Portions of the various mechanisms on bicycles are similarly made of materials such as: aluminum alloys; synthetic resins, or the like, for the purpose of reducing the overall weight thereof.

The synthetic-resin-made parts can be manufactured inexpensively and are lightweight and are therefore advantageous for reducing the overall weight of fishing reels and bicycle parts. However, such resin-made parts have a small bending elastic modulus. Therefore, if the rigidity is to be maintained, the thickness of the part must be large and thus the overall weight of the part is increased. Further, it is difficult to obtain surface textures of the part which provide a desirable touch-feeling and difficult to provide a high grade appearance from such resin-made parts.

Aluminum-alloy-made parts are more expensive and larger in weight than the resin-made part, but the bending elastic modulus thereof is larger than that of the resin-made part. Therefore, the small thickness can be attained more easily than the resin-made part, and further an excellent touch-feeling and high grade appearance can be obtained easily. However, the bending elastic modulus is not as large as other metals such as steel, and if sufficient rigidity is to be maintained, the thickness of the part must be undesirably large and the resultant weight is large.

It is conceivable to use a magnesium alloy, which is small in weight and high in rigidity, for these parts. However, it is difficult to use the magnesium alloy for all of the parts because magnesium alloy is expensive, lacks adequate strength, etc. For this reason, other materials are increasingly being sought to use in manufacturing parts. Further, if a part made of magnesium-alloy is used in combination with the parts of other materials, there is a possibility that electrolytic corrosion may occur on the magnesium-alloy-made part due to the contact with the parts of the other materials. The electrolytic corrosion due to contact between two metals, for instance, iron parts with magnesium parts, is a result of incompatible ionization characteristics of the two materials. Specifically, the ionization energy of specific metals are such that some metals corrode when in contact with metals with an ionization energy that is not compatible.

SUMMARY OF THE INVENTION

An object of the present invention is to prevent electrolytic corrosion on a magnesium-alloy-made part even if the magnesium-alloy-made part is used in combination with parts made of other materials with incompatible ionization characteristics.

In accordance with one aspect of the present invention, a mechanical assembly includes a first part made of a magnesium alloy and a second part made of an aluminum alloy, which is in direct contact with the first part and mounted to the first part.

Preferably, the first part is a line winding spool for a fishing reel, and the second part is a spool shaft mounted to the spool.

In accordance with another aspect of the present invention, a mechanical assembly includes a first part made of a magnesium alloy and second part made of a first metal having an ionization energy that is smaller than the ionization energy of the magnesium alloy. The second part is mounted to the first part. A third part made of a second metal, having an ionization energy that is smaller than the magnesium alloy and larger than the ionization energy of the first metal, is in direct contact with the first part and is interposed between the first part and the second part.

Preferably, the second metal is one of the following groups of metals: aluminum alloys and zinc alloys.

In accordance with another aspect of the present invention, mechanical assembly includes a first part made of a magnesium alloy and a second part made of a metal having an ionization energy that is smaller than the ionization energy of the magnesium alloy. The second part is coupled to the first part. A third part made of an insulating material. The third part is in direct contact with the first part and is interposed between the first part and the second part.

Preferably, the second part is made of a stainless steel.

Preferably, the second part is made of titanium or a titanium alloy.

Preferably, the first part is a spool for a fishing reel, the second part is a spool shaft mounted to the spool, and the third part is a cylindrical sleeve interposed between the first part and the second part.

Preferably, the first part is formed by an injection molding process.

Preferably, the first part is formed using a diecasting molding process.

Preferably, a metal oxide film is formed on a surface of the first part, the metal oxide film being exposed to ambient air.

Preferably, a filling agent is inserted between adjacent ones of the first part, the second part and the third part.

Preferably, the filling agent is a liquid injectable using a capillary phenomenon.

Preferably, the filling agent is a liquified adhesive agent which solidifies after being insertion.

Preferably, the mechanical assembly is a fishing reel assembly configured for mounting to a fishing rod for winding a fishing line.

Preferably, the mechanical assembly is a bicycle mechanical device mounted to a bicycle.

Preferably, the fishing reel includes a reel main body mounted onto the fishing rod, the reel main body defining the first part. Further, a spool is mounted onto the reel main body for winding the fishing line therearound, the spool defining the second part.

Preferably, the fishing reel is a double bearing reel in which the spool is mounted onto sides of the reel main body so as to be rotatable about an axis of a direction intersecting an axial direction of the fishing rod.

Preferably, the fishing reel includes a reel body having a casing portion supporting the spool and a rod attaching portion formed integrally with the casing portion, and a lid portion removably fixed to the reel body.

Preferably, the mechanical assembly is a crank assembly from a bicycle.

In the present invention, since the first part made of the magnesium alloy contacts the second part made of the aluminum alloy, electrolytic corrosion hardly occurs even though these parts are directly contacted with each other. This is because the ionization energy of each metal is such that there is little likelihood of a reaction between the two metals. Hence, the two metals are compatible with one another having ionization characteristics that are compatible.

With the present invention being applied to a fishing reel, where the first part is a line winding spool for a fishing reel, and the second part is a spool shaft mounted to the spool, it is possible to construct the fishing reel with a reduced thickness and reduced weight while maintaining rigidity. Further, it is unlikely that the spool will undergo electrolytical corrosion since the spool shaft is made of an aluminum alloy that is close in ionization energy to the magnesium alloy.

In the aspect of the present invention where the third part is made of an aluminum alloy or a zinc alloy, it is unlikely that the first part will undergo electrolytical corrosion even if the first part made of the magnesium alloy.

In the aspect of the present invention where the third part made of the insulating material interposed between the first part and the second part, the first part and the second part are electrically insulated from each other. Therefore, electrolytical corrosion is unlikely.

In the aspect of the present invention where the first part is obtained by an injection molding process, a Thixomolding™ process may be used. As a result, the first part can be manufactured without the deficiency and breakage associated with reduced thickness. Therefore, the first part can be reduced in thickness and weight while being maintained in rigidity sufficiently.

In the aspect of the present invention where a metal oxide film is formed on a surface of the first part, the first part may be exposed to an ambient air. In this case, the anti-corrosion properties of the first part made of magnesium alloy are enhanced. Therefore, the part will last longer improving the overall life of the device using the first part.

In the aspect of the present invention where a filling agent is inserted into the small clearance by the capillary phenomenon, the anti-corrosion property can be further improved.

In the aspect of the present invention where the parts may be used in a bicycle assembly, the corrosion of the mechanism in the bicycle is unlikely to occur even if the magnesium alloy is used for a bicycle part assembly.

DETAILED DESCRIPTION OF THE PREFERRED EMBODIMENTS

Embodiment 1

Figure 1:
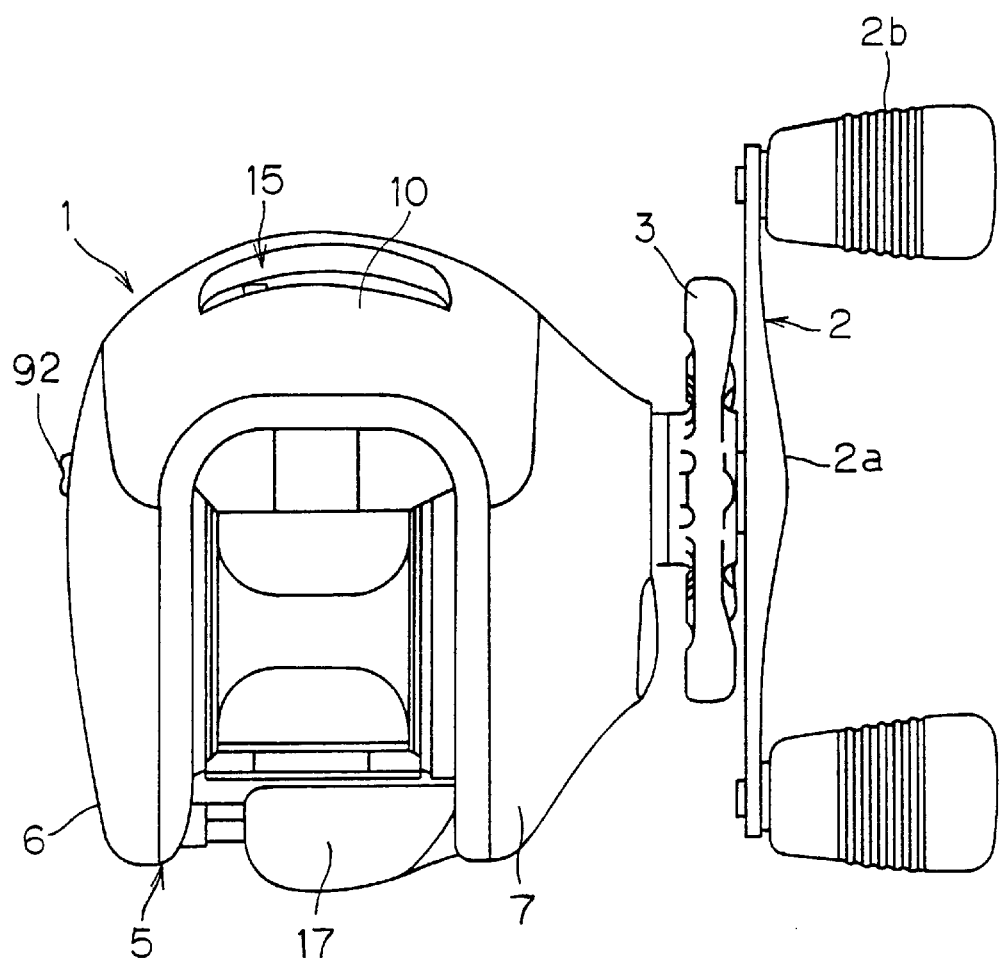
FIG. 1 is a top view of a double bearing reel that employs one embodiment of the present invention.

FIG. 1 is a plan view of a double bearing reel in accordance with a first embodiment of the present invention.

The double bearing reel shown in the drawing is a bait casting reel that includes a reel main body 1. A spool rotation handle 2 is disposed on a first side of the reel main body 1, and a star drag 3 disposed on the first side of the reel main body 1 proximate the handle 2 for the drag adjustment. The handle 2 is of a double handle type having a plate like arm portion 2a, and knobs 2b rotatably mounted on the respective ends of the arm portion 2a. The outer circumferential surface of the arm portion 2a is constructed with a smooth and jointless surface to provide a fishing line anti-entanglement structure.

Figure 2:
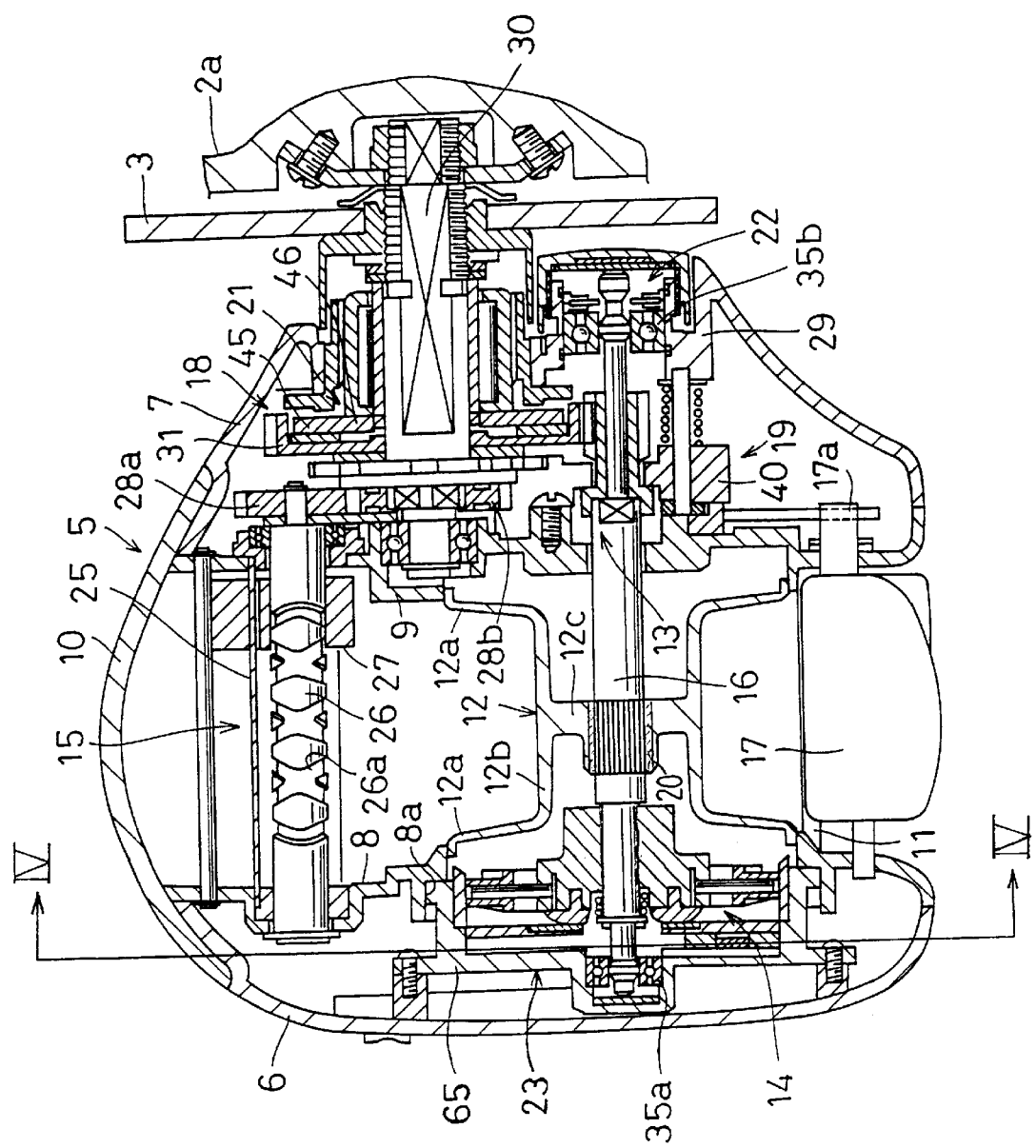
FIG. 2 is a cross-sectional view of the double bearing reel depicted in FIG. 1.

As shown in FIG. 2, the reel main body 1 includes a frame 5 made of a magnesium alloy, and first and second side covers 6 and 7 also made of a magnesium alloy. The first and second side covers 6 and 7 are mounted on respectively side faces of the frame 5. A front cover 10 made of a magnesium alloy is mounted on the front face of the frame 5. Each of these magnesium-alloy-made parts is made by injection molding according to a Thixomolding™ process (for instance, the process used by THX MOLDING, Division of Linberg Corp.). Thereafter, each part is subjected to a chrome plating process to secure the anti-corrosion property on the outer circumferential surface thereof. The frame 5 includes a pair of side plates 8 and 9 confronted with each other at a predetermined distance, and a plurality of connecting portions 11 connecting these side plates 8 and 9 together. The manufacture of the reel main body 1 by the injection molding according to the Thixomolding™ process can reduce the possibility deficiencies and the breakage even if the reel main body is made thin, and can maintain the strength and attain the light weight.

Figure 4:
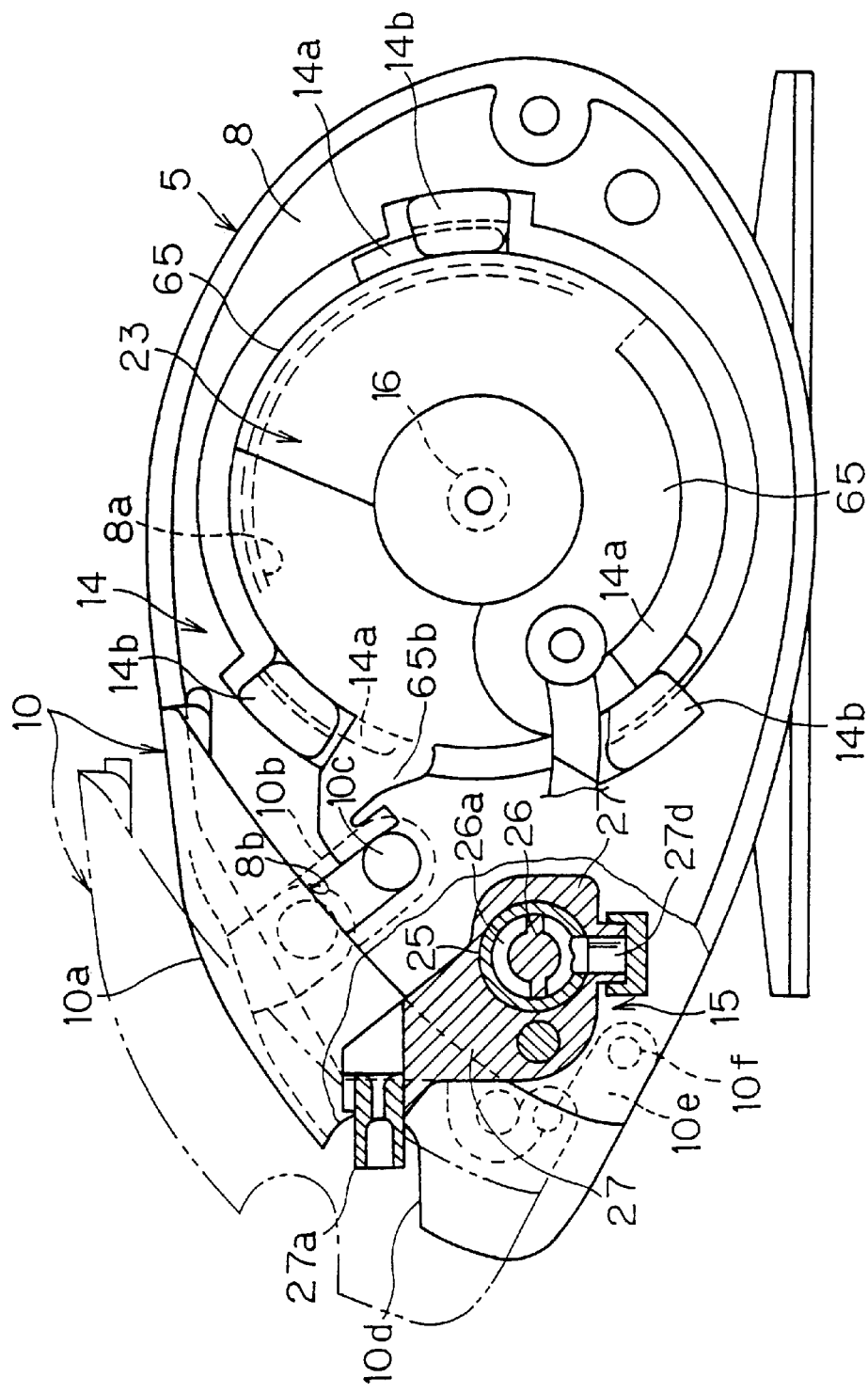
FIG. 4 is part cross-sectional, part cutaway side view of the double bearing reel taken along the line IV—IV in FIG. 2.

The second side cover 7 on the handle 2 side is removably fixed to the side plate 9 by screws made of an aluminum alloy. The first side cover 9 on the side opposite from the handle 2 is removably mounted on the side plate 8 of the frame 5 by a bayonet structure 14. The side plate 8 on the side opposite from the handle 2 is formed with an opening 8a as shown in FIG. 4, which permits the spool 12 to pass therethrough. An elongated hole 8b is formed in front of the opening 8a to mount the front cover 10 to be open and closed freely. The elongated hole 8b is formed in a forwardly inclined manner, and a similar elongated hole (not shown) is formed in the side plate 9 of the handle 2 side in the inclined manner corresponding in location to this elongated hole 8b.

As shown in FIGS. 1 and 4, the front cover 10 includes a cover main body 10a constructed with a smooth curvature continuous with the side covers 6 and 7, and a mounting leg portions 10 for mounting the cover main body 10a to the side plates 8 and 9. An opening 10d is formed in the front face of the cover main body 10a, which permits the movement of a line guide 27 of a level wind mechanism 15, as is described below. Engagement pieces 10e are formed in the front and lower portions of the front cover 10 for engagement with the side plates 8 and 9. A distal end of each engagement piece 10e is formed with a semi-spherical protrusion 10f which can be moved into a recessed hole (not shown) formed in the inner face of the side plate 8, 9.

The mounting leg portion 10b is in the form of a U-shape in a front view, and has a shaft portion 10c extends outwardly from each distal end thereof (the shaft portion 10c on the side plate 8 side is only shown in FIG. 4). The shaft portions 10c extend into the side plates 8 and 9 so as to be movable in the longitudinal direction of the elongated holes, respectively. The shaft portion 10c on the side plate 8 side is protruded outwardly further from the side plate 8. The front cover 10 of this type is movable between an open position and a closed position as indicated, respectively, by a two-dotted chain line and a solid line in FIG. 4.

Within the frame 5 are the spool 12, a level winding mechanism 15 for uniformly winding the fishing line onto the spool 12, and a thumb rest 17 on which a thumb is placed during a thumbing operation. Between the frame 5 and the second side cover 7 are a gear mechanism 18 for transmitting the rotational torque from the handle 2 to the spool, 12 and the level winding mechanism 15. A clutch mechanism 13, a clutch engaging/disengaging mechanism 19 for engagement/disengagement of the clutch mechanism 13 in association with the operation of the thumb rest 17, a drag mechanism 21, and a first casting control mechanism 22 are also disposed between the frame 5 and the second side cover 7. Between the frame 5 and the first side cover 6 there is a centrifugal braking mechanism 23 for suppressing the backlash during casting, and a second casting control mechanism 24.

Figure 3:
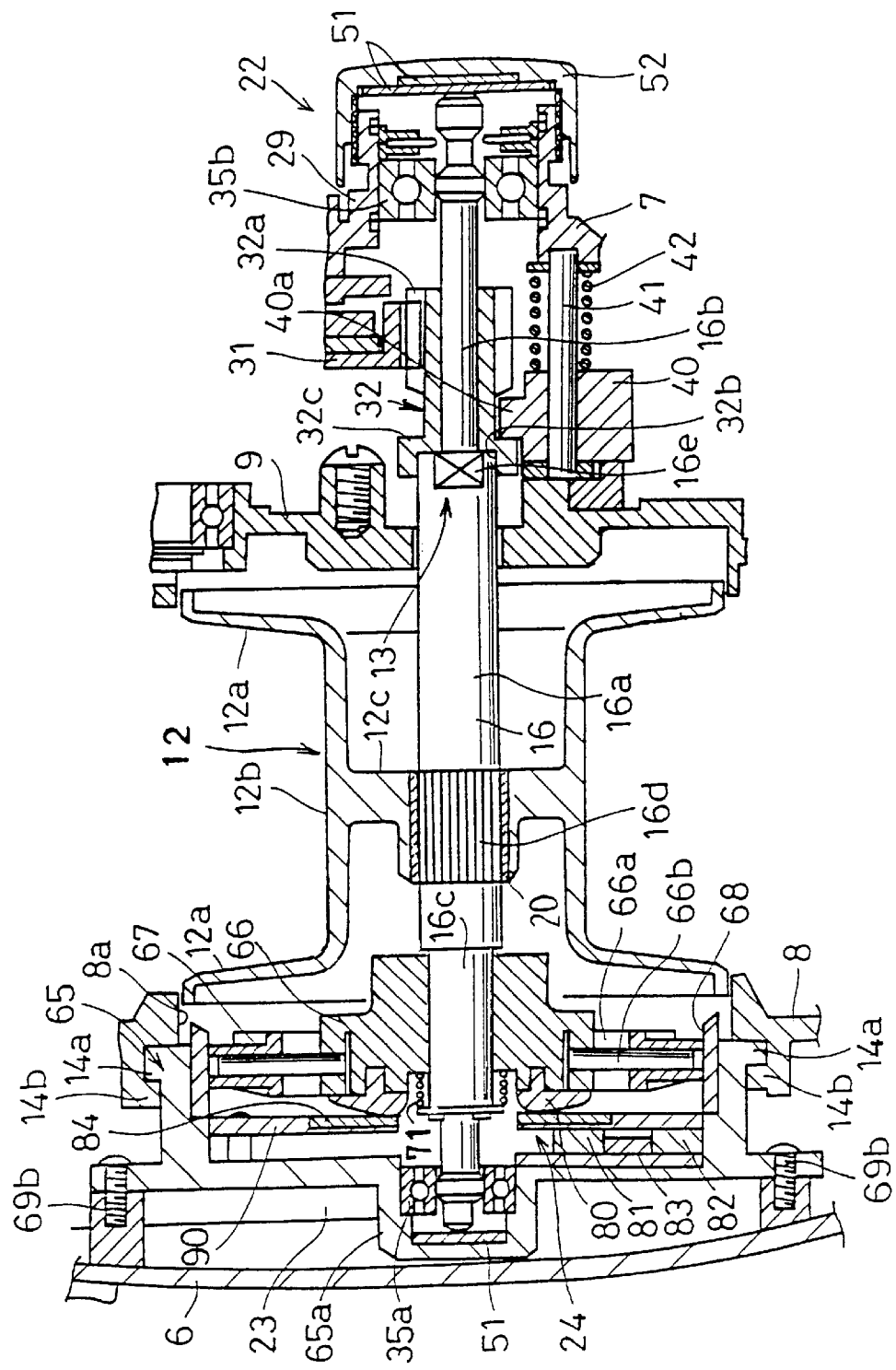
FIG. 3 is a cross-sectional view of a portion of the spool and surrounding structure of the double bearing reel depicted in FIG. 2, on an enlarged scale.

The spool 12 is a magnesium-alloy-made member obtained by the injection molding in accordance with the Thixomolding™ process. The spool 12 has dish-like flange portions 12a at both sides, and a line winding barrel portion 12b between the flange portions 12a. The spool 12 has an integral hollow boss portion 12c at the substantially central portion in the axial direction and the inner circumferential side of the line winding barrel portion 12b. A sleeve 20 made of an aluminum alloy is pressure-inserted into the inner circumferential side of the boss portion 12c as shown in FIG. 3. The sleeve 20 is positioned to prevent the electrolytic corrosion of the spool 12 made of a magnesium alloy. The spool 12 is non-rotatably fixed to a spool shaft 16 passing through the sleeve 20, for instance, by a serration connection. A manner of fixing is not limited to fixing method employing recesses and protrusions of the serration connection or the like, and various connection methods such as adhesion, insertion molding, or the like are employable.

The spool shaft 16 is, for instance, a stainless-steel-made rod-like member, and, as shown in FIG. 3, penetrates the side plate 9 to extend outwardly from the second cover 2. If the stainless-steel-made spool shaft 16 of this type is directly contacted with the magnesium-alloy-made spool 12, the spool 12 may undergo electrolytic corrosion since the magnesium alloy has a much larger ionization energy than the stainless steel (iron). To avoid this, the sleeve 20 made of an aluminum alloy, having generally neutral ionization characteristics, is disposed between the magnesium alloy and the stainless steel. The extending end of the spool 16 is rotatably supported by a bearing 35b in a boss portion 29 formed in the second side cover 7. The other end of the spool shaft 16 is rotatably supported by a bearing 35a within the centrifugal braking mechanism 23. Each of these bearings is preferably a sealed ball bearing assembly. The spool shaft 16 has a central large diameter section 16a to which the spool 12 is fixed, and two small diameter sections 16b and 16c on both ends thereof.

The large diameter section 16a is disposed within a space inside the line winding barrel portion 12b, and the central outer circumferential surface thereof is formed into a serration 16d for fixing the spool 12. A planar chamfering portion 16e is formed on the right end of the large diameter section 16a in FIG. 3 to define a portion of the clutch mechanism 13.

The left side small diameter section 16c is diameter-reduced to two stages in a step-wise manner, and a distal end thereof is supported by a bearing 35 in a brake casing 65. A pinion gear 32 is axially movably supported on the right side small diameter section 16b. The distal end of the smaller diameter section is rotatably supported by a bearing 35a. In addition, in order to suppress the rotational friction increase, each end of the spool shaft 16 is made spherical.

As shown in FIGS. 2 and 4, the level winding mechanism 15 includes a guide cylinder 25 that is fixed between the pair of the side plate 8 and 9. Further, a worm shaft 26 is rotatably supported within the guide cylinder 25, and a line guide 27. An axially elongated groove is formed in the outer circumferential portion of the guide cylinder 25, and an engagement portion 27d mounted on the line guide 27 extends through that groove toward the worm shaft 26. A gear 28a constructing the gear mechanism 18 is fixed to the end of the worm shaft 26. Spiral grooves 26a are formed in the worm shaft 26 so that the engagement portion 27d is engaged with this spiral groove 26a. Therefore, when the worm shaft 26 is rotated through the gear 18, the ling guide 27 reciprocates along the guide cylinder 27. A fishing line inserted and passed through this line guide 27 is uniformly wound up onto the spool 12. A hard ring 27a for guiding the fishing line is fitted to the upper portion of the line guide 27.

As shown in FIG. 2, the gear mechanism 18 includes a main gear 31 fixed to a handle shaft 30. The hollow pinion gear 32 meshes with the main gear 31. The aforementioned gear 28a is fixed to the end of the worm shaft 26, and a gear 28b non-rotatably is fixed to the handle shaft 30 and meshing with the gear 28a.

As shown in FIG. 3, the pinion gear 32 is a hollow member that is located outwardly of the side plate 9 and that is penetrated by the spool shaft 16. The pinion gear 32 is axially movably mounted on the spool shaft 16. The pinion gear 32 has a tooth portion 32a that is formed on the outer circumferential portion of the right end of FIG. 3 and which meshes with the main gear 32. An engagement portion 32b is formed on the other end thereof, and a constricting portion 32c formed between the tooth portion 32 and the engagement portion 32b. The engagement portion 32b is constructed with an oblong recessed hole formed in the end face of the pinion gear 32, with which the chamfering portion 16e formed on the end of the large diameter section 16a of the spool shaft 16 is engaged. If the pinion gear 32 is moved outwardly so that the recessed hole of the engagement portion 32b and the chamfering portion 16e of the spool shaft 16 are disengaged from each other, the rotational torque from the handle shaft 30 is not transmitted to the spool 12. The recessed hole of the engagement portion 32b and the chamfering portion 16e form the clutch mechanism.

As shown in FIG. 2, the thumb rest 17 is disposed at a rear portion of the fishing reel between the pair of the side plates 8 and 9 rearward of the spool 12. The thumb rest 17 is also used as a clutch operation lever. The side plates 8 and 9 of the frame 5 are formed with elongated holes (not shown), and a rotational shaft of the thumb rest 17 is rotatably supported by the elongated holes. Therefore, the thumb rest 17 is slidable vertically along the elongated holes.

As shown in FIG. 3, the clutch engaging/disengaging mechanism 19 has a clutch yoke 40. The clutch engaging/disengaging mechanism 19 moves the clutch yoke 40 in parallel to the axis of the spool shaft 16 in association with the rotational motion of the thumb rest 17. When the handle shaft 30 is rotated in the fishing line winding-up direction, the clutch yoke 40 is moved so that the clutch mechanism 13 is activated automatically. The clutch yoke 40 is disposed on the outer circumferential side of the spool shaft 16, and supported movably in parallel to the axis of the spool shaft 16 by two pins 41 (only one pin is shown). In addition, the spool shaft 16 is rotatable relative to the clutch yoke 40. That is, when the spool shaft 16 is rotated, the clutch yoke 40 is not rotated. The clutch yoke 40 has an engagement portion 40a at its central portion, which is engaged with the constricted portion 32c of the pinion gear 32. Further, a spring 42 is arranged around each pin 41 supporting the clutch yoke 40 and between the clutch yoke 40 and the second side cover 7 so that the clutch yoke 40 is constantly biased inwardly (toward the clutch engagement) by the spring 42.

In the arrangement thus constructed, the pinion gear 32 under a normal condition is located at the clutch engagement position in which the engagement portion 32b is brought into engagement with the chamfering portion 16e of the spool shaft 16 to thereby establish the clutch-on state. On the other hand, when the pinion gear 32 is moved outwardly by the clutch yoke 40, the engagement between the engagement portion 32b and the chamfering portion 16e is released to thereby establish the clutch-off state.

As shown in FIG. 2, the drag mechanism 21 includes a friction plate 45, and a depression plate 46 which depresses the friction plate 45 onto the main gear 31 with a given force in accordance with the rotational operation of the star drag 3.

The first casting control mechanism 22 includes, as shown in FIG. 3, a plurality of friction plates 51 arranged to hold the ends of the spool shaft 16 therebetween, and a cap 52 for adjusting the holding force of the friction plates 51 to the spool shaft 16. The left side friction plate 51 is mounted within the brake casing 51. The cap 52 is embedded into the boss portion 29 so that it can not be operated without the use of the special tool. The first casting control mechanism 22 is used to restrict axial clattering of the spool shaft 16 rather than the braking force control. In this embodiment, therefore, the first casting control mechanism 22 provides no substantive braking force to the spool shaft 12.

The centrifugal brake mechanism 23 includes, as shown in FIG. 3, the brake casing 65, a rotary portion 66 provided within the brake casing 65, sliders 67 radially movably mounted onto the rotary portion 66 and arranged at angular intervals, and a hollow brake liner 68 fixed to the inner circumferential surface of the brake casing.

The brake casing 65 is a short cylindrical member having a bottom, and an outwardly protruded bearing accommodating portion 65a is formed at a central portion of the bottom. The bearing 35a for supporting the spool shaft 16 is accommodated within the portion 65a, and the friction plate 51 of the first casting control mechanism 22 is mounted onto the bottom face of the portion 65a. The brake casing 65 is fixed to the first side cover 6 by two screws 69a and 69b. Three protrusions 14a are arranged on the outer circumferential surface of the brake casing 65 at angular intervals to construct the bayonet construction 14. In addition, the opening 8a has retaining claws 14b corresponding in location to the protrusions 14a. Each retaining claw 14b is in the form of an L-shape protruded outwardly from the opening.

As shown in FIG. 4, a rotation preventive protrusion 65b is configured to abut against the peripheral surface of a shank portion 10c of the front cover 10 and formed on the outer circumferential surface of the brake casing 65. The rotation preventive protrusion 65b abuts against the shank portion 10c when the front cover 10 is in the closed position, so as to prevent the rotation of the first side cover 6. That is, the shank portion 10c of the front cover 10 serves to prevent the rotation of the first side cover 6. Since the front cover 10 covering the front portion of the frame 5 in response to opening and closing prevents the first side cover 6 from rotating, otherwise required dedicated rotation preventive members can be dispensed with in order to prevent the rotation of the first side cover 6.

The rotary portion 66 is a disk-like member, which is formed with a plurality of recesses 66a at angular intervals on the outer circumferential portion thereof as shown in FIG. 3. Guide shafts 66b are implanted in the recesses 66a to extend radially outward. The rotary portion 66 is axially movably and non-rotatably coupled to the spool shaft 16. The rotary portion 66 is biased toward the spool 12 by a depression spring 71 disposed around the small diameter section 16c of the spool shaft 16.

Sliders 67 are slidably supported on the plurality of guide shafts 66b and are disposed in the recesses 66a of the rotary portion 66, respectively. The sliders 67 move radially outwardly by the centrifugal force so as to be slidably in contact with the brake liner 68 in the brake casing 65, thereby braking the spool 12. Here, since the centrifugal force increases in proportion to the square of the rotational speed, the braking force of the centrifugal brake mechanism 23 increases in proportion to the square of the rotational speed.

Figure 5:
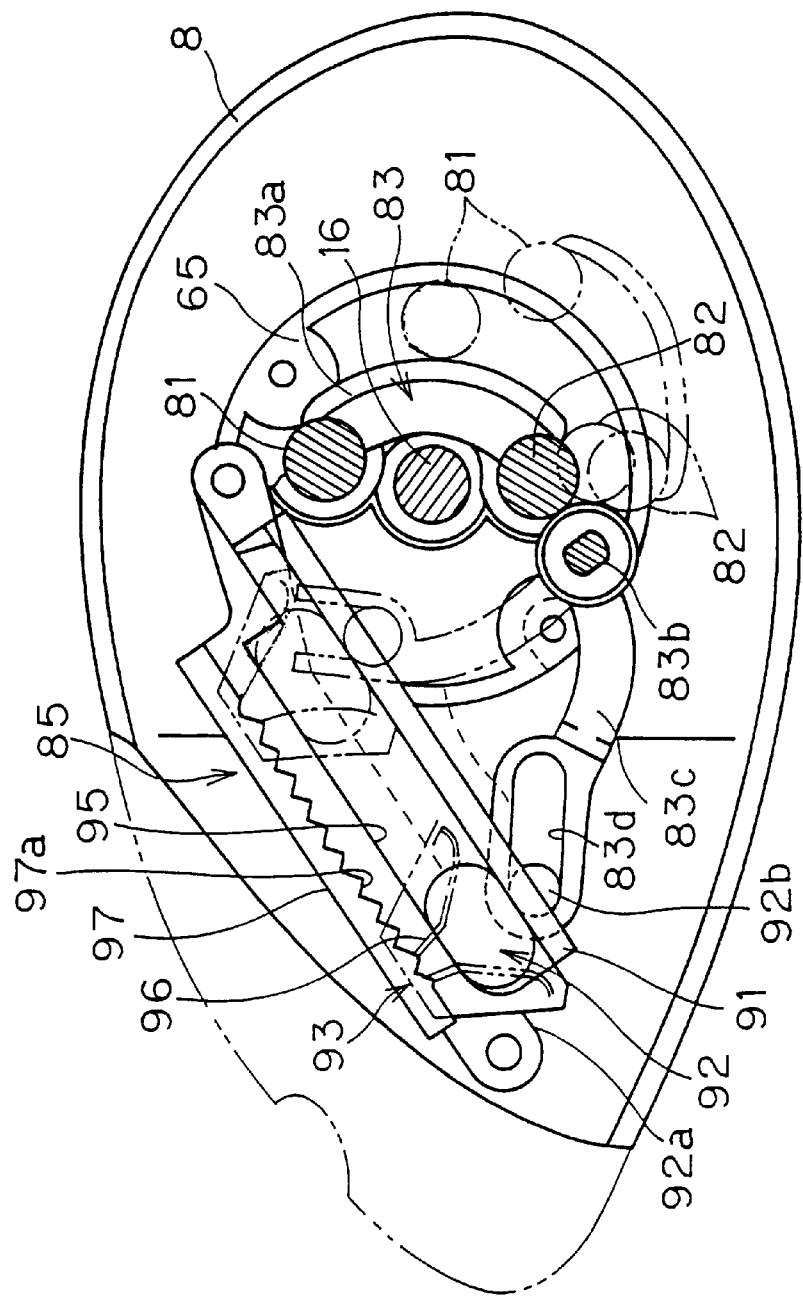
FIG. 5 is a cross-sectional side view similar to FIG. 4, with various elements removed to provide greater clarity.

The second casting control mechanism 24 is disposed within the brake casing 65 as shown in FIGS. 3 and 5. The second casting control mechanism 24 includes a magnetic plate 80 fixed to the end face of the rotary portion 66, a braking swing arm 83 having two magnets 81 and 82 which attract the magnetic plate 80, a brake liner 84 disposed in the brake casing 65 confronting the magnetic plate 80, and a brake adjusting portion 85 for adjusting the braking force by swingingly operating the swing arm 83. This second casting control mechanism 24 varies the magnetic flux amount acting onto the magnetic plate 80, thereby adjusting the braking force.

The magnetic plate 80 is a soft-iron-made disk-like member, which is fixedly attached to the end face of the rotary portion 66 by a suitable fixing means such as welding or the like. The rotary portion 66 to which this magnetic plate 80 is fixedly attached is moved axially outwardly by the attraction of the magnets 81 and 82 so as to make the magnetic plate in contact with the brake liner 84.

The swing arm 83 is an arm swingable between the maximum braking position indicated by a solid line in FIG. 5 and a minimal braking position indicated by a two-dotted chain line. The swing arm 83 includes a magnet holding arm 83a that retains the two magnets 81 and 82 at a predetermined distance therebetween. A swing shaft 83b is non-rotatably mounted onto the proximal end of the magnet holding arm 83a, and an operation arm 83c the proximal end of which is non-rotatably mounted onto the swing shaft 83b. The magnet holding arm 83a is an arcuate arm member, which holds the two magnets 81 and 82 in the vicinities of its longitudinally distal and proximal ends, respectively. Here, if the swing arm 83 is located at the maximum braking position, the two magnets 81 and 82 are disposed at substantially symmetrical positions facing the magnetic plate 80 with the spool shafts 16 disposed therebetween. The swing shaft 83b is rotatably supported onto the bottom surface of the brake casing 65. One end of this swing shaft 83b is non-rotatably mounted onto the magnet holding arm 83a, whereas the other end thereof is non-rotatably mounted onto the operation arm 83c. The operation arm 83c is an arcuate arm member, which is formed with an elongated hole 83d at its distal end. When the operation arm 83c is pivotally moved, the magnet holding arm 83a is pivotally moved through the swing shaft 83b so as to vary the opposing areas of the magnets 81 and 82 to the magnetic plate 80, thereby varying the magnetic flux density of the magnets 81 and 82 passing through the magnetic plate 80. This varies the attraction force to the magnetic plate 80, the friction force between the magnetic plate 80 and the brake liner 84, and thus the braking force.

The brake liner 84 is non-rotatably mounted onto the central portion of an intermediate plate 90 arranged in parallel to and distanced from the bottom portion of the brake casing 65 so as to be concentric with the spool shaft 16. The brake liner 84 is made of anti-friction nylon resin such as a POLYSLIDER (trade name) or the like, and brought into contact with the magnetic plate 80 to brake the spool 12.

The brake adjusting portion 85 includes a guide member 91 fixed obliquely onto the inner circumferential surface of the first side cover 6, a handle member 92 guided by the guide member 91, and a positioning mechanism 93 for positioning the handle member 92.

The guide member 91 is arranged along a guide hole 95 formed obliquely in the first side cover 6 so as to guide the handle member 92 in the longitudinal direction. The handle member 92 has a knob portion 92a exposed outwardly of the first side cover 6, and a link shaft portion 92b protruded inwardly of the first side cover 6. The link shaft 92b is retained to the elongated hole 83d formed in the distal end of the operation arm 83c. Consequently, when the handle member 92 is moved between the maximum brake position indicated by a solid line and the minimal brake position indicated by a two-dotted chain line, the link shaft 92b is moved between the upper end and the lower end of the elongated hole 83d, and the operation arm 83c is swingingly moved between the maximum brake position and the minimum brake position. The positioning mechanism 93 includes a positioning spring 96 fixed to the knob member 92a and a positioning metal fitting 97 for positioning the positioning spring 96 in the moving direction of the handle member 92. The positioning spring 96 is a plate spring bent into a V-shape, and the apex thereof is bent into an arcuate shape. The positioning metal fitting is formed with arcuate corrugations each corresponding in configuration to the arcuate portion of this positioning spring 96. Therefore, when the handle member 92 is moved, the positioning spring 96 is brought into abutment with the corrugations 97a of the positioning metal fitting 97 so as to position the handle member 92. Consequently, the handle member 92 can be positioned at either of plural positions between the maximum brake position and the minimal brake position so that the braking force can be adjusted with plural stages.

Next, the operation of the reel will be described.

Under a normal condition, the clutch yoke 40 is pressed inwardly (toward the left in FIG. 3) by the spring 42 so that the pinion gear 32 is moved to the engagement position. Under this condition, the engagement portion 32b of the pinion gear 32 meshes with the chamfering portion 16e of the spool shaft 16 to establish the clutch-on condition. Therefore, the rotational torque from the handle 2 is transmitted through the handle shaft 30, the main gear 31, the pinion gear 32 and spool shaft 16 to the spool to rotate the spool 12 in the line winding-up direction.

When casting, the braking force is adjusted by the handle member 92 to suppress backlash. Thereafter, the thumb rest 17 is depressed downwardly. Here, the thumb rest 17 is moved along the elongated holes of the side plates 8 and 9 to the lower disengagement position. The movement of the thumb rest 17 causes the clutch yoke 40 to be moved outwardly, and the pinion gear 32 engaged with the clutch yoke 40 is moved in the same direction accordingly. Consequently, the engagement portion 32b of the pinion gear 32 is disengaged from the chamfering portion 16e of the spool shaft 16 to establish a clutch-off condition. Under the clutch-off condition, the rotation from the handle shaft 30 is not transmitted to the spool 12 and the spool shaft 16, so that the spool 12 is freely rotatable. By swinging a fishing rod such that the reel is inclined in the axial direction so that the spool shaft 16 is directed along the vertical surface while thumbing the spool with a thumb placed on the thumb rest 17 in the clutch-off condition, a lure may be cast out. When casting, the spool 12 rotates in the line feeding direction powerfully.

Under this condition, the rotation of the spool 12 rotates the spool shaft 16 in the line feeding direction, and that rotation is transmitted to the rotary portion 66. When the rotary portion 66 is rotated, the sliders 67 are slidingly contacted with the brake liner 68 so that the spool 12 is braked by the centrifugal brake mechanism 23.

On the other hand, depending on the position of the swing arm 83, the magnetic plate 80 is attracted by the magnets 81 and 82 and move together with the rotary portion 66 toward the brake liner 84 side against the biasing force of the depression spring 71. In this case, the magnetic plate 80 contacts the brake liner 84 by the attracting force depending on the swinging position of the swing arm 83. Consequently, the spool 12 is braked by a desired braking force caused by a frictional force between the magnetic plate 80 and the brake liner 84, and the trouble such as the backlash or the like is reduced.

Even if the backlash occurs at the spool 12, the backlash can be solved easily since the first side cover 6 can be detached and attached easily with the aid of the bayonet structure 14. This detachment and attachment procedure of the first side cover 6 will be described below.

Figure 6:
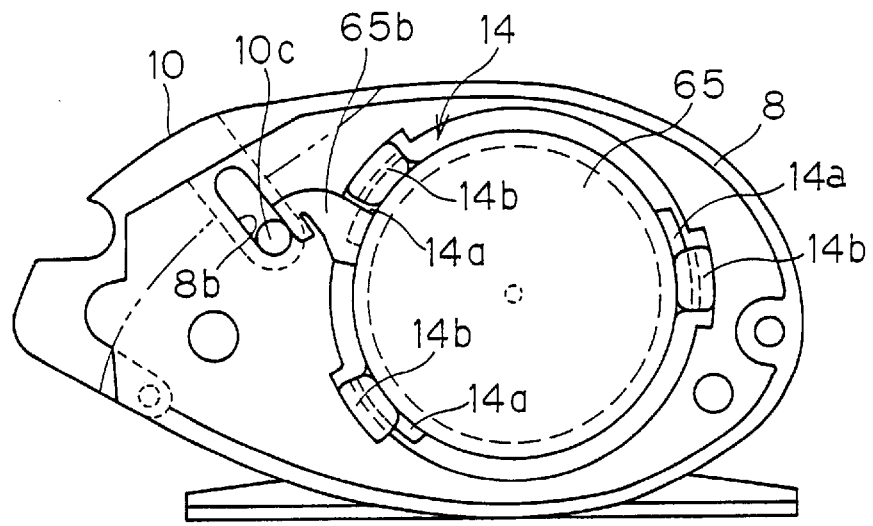
FIG. 6 is a cross-sectional side view similar to FIGS. 4 and 5, showing a front cover in a closed position.

Under normal conditions, the front cover 10 is arranged at a closed position shown in FIG. 6. In this case, the shaft portion 10c of the front cover 10 is located at the lower end of the elongated hole 8b. The rotation preventive protrusion 65b fixed to the brake casing 65 abuts against the shaft portion 10c so that the first side cover 6 fixed to the brake casing 65 cannot be rotated in the counterclockwise direction in FIG. 6.

Figure 7:
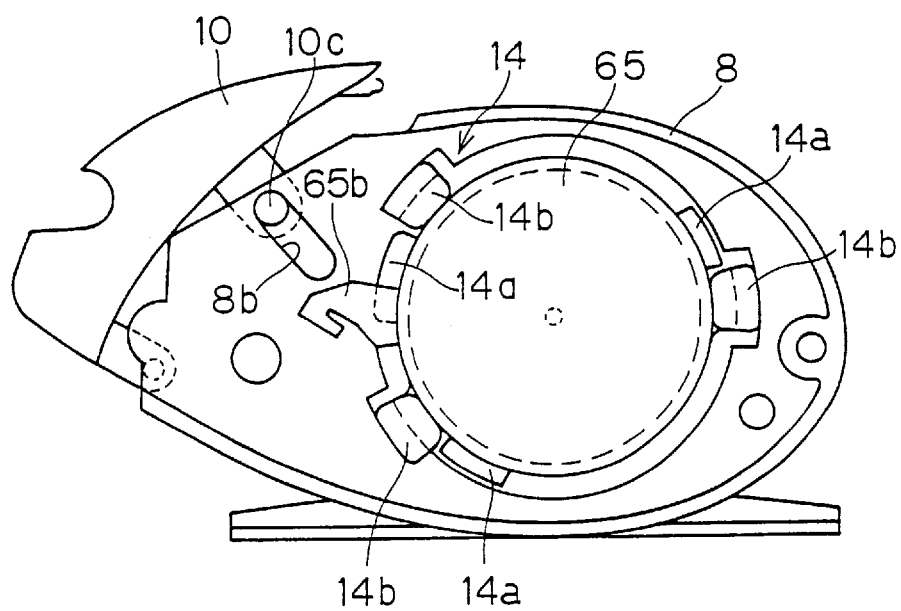
FIG. 7 is a cross-sectional side view similar to FIG. 6, showing the front cover in an open position.

In a case where the first side cover 6 is removed from the side plate 8 in order to remove the spool 12, the front cover 10 is pulled out to the open position as shown in FIG. 7. When the front cover 10 is pulled out, the shaft portion 10c of the front cover 10 is guided by the elongated hole 8b and moved to the upper end. The shaft portion 10c is released from the rotation preventive protrusion 65b to make the first side cover 6 rotatable in the counterclockwise direction in FIG. 7. Under this condition, when the first side cover 6 is rotated in the counterclockwise direction, the protrusions 14a are disengaged from the retaining claws 14b mounted to the side plate 8 so as to permit the first side cover 6 to be removed from the side plate 8. When the first side cover 6 is removed, and if the spool 12 is braked by the second casting control mechanism 24, then the magnetic plate 80 attracted by the magnets 81 and 82 can be removed together with the side cover 6. If not braked, it can be removed through the opening 8a.

The double bearing reel constructed in this manner can contribute to the reduction of reel weight while maintaining the strength thereof since the reel main body 1 and the spool 12 are made of magnesium alloy. Further, since each of these parts can be obtained by the injection molding in accordance with the Thixomolding™ process, the breakage and the deficiency can be reduced even if each part is made thin.

In order to avoid the direct contact between the magnesium-alloy-made spool and the spool shaft 16 having largely incompatible ionization characteristics, the sleeve 20 is interposed therebetween. Thus, the electrolytic corrosion hardly occurs on the spool 12.

Embodiment 2

Although in Embodiment 1 the present invention is described by referring to the double bearing reel as a fishing reel by way of example, the present invention can also be applied to a spinning reel.

Figure 8:
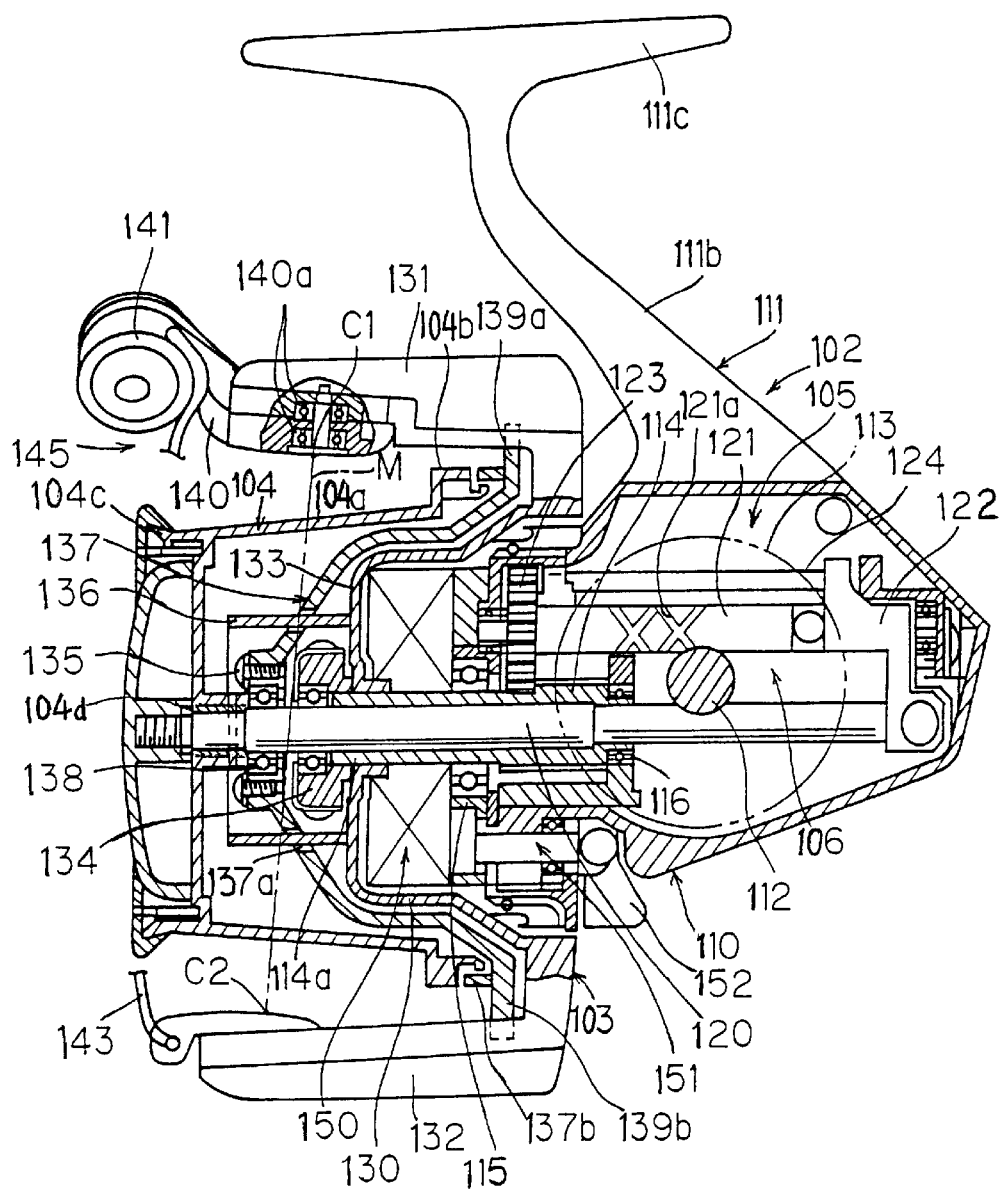
FIG. 8 is a cross-sectional side view of a spinning reel in accordance with a second embodiment of the present invention.
Figure 9:
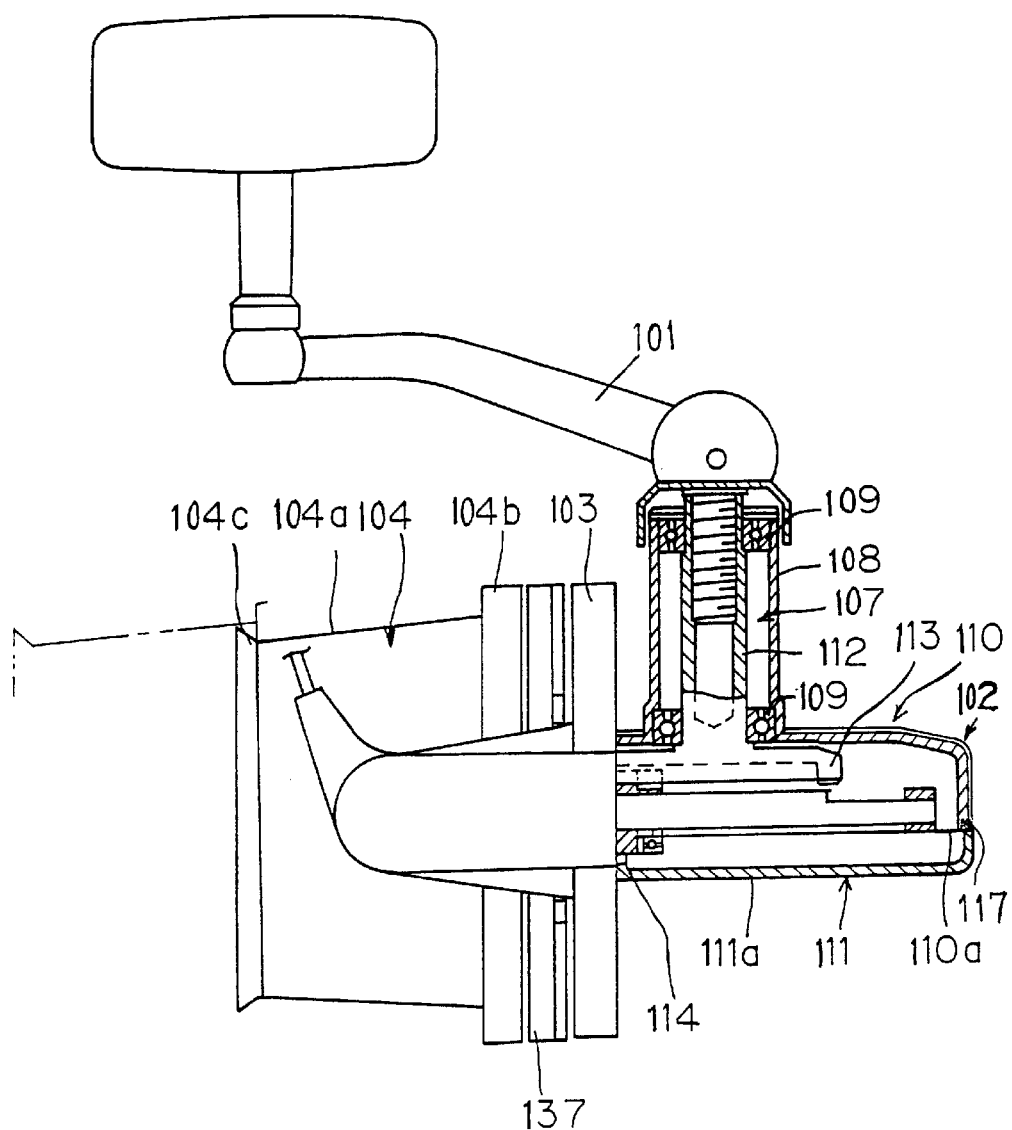
FIG. 9 is a fragmentary, part cross-sectional bottom view of the spinning reel depicted in FIG. 8.
Figure 10:
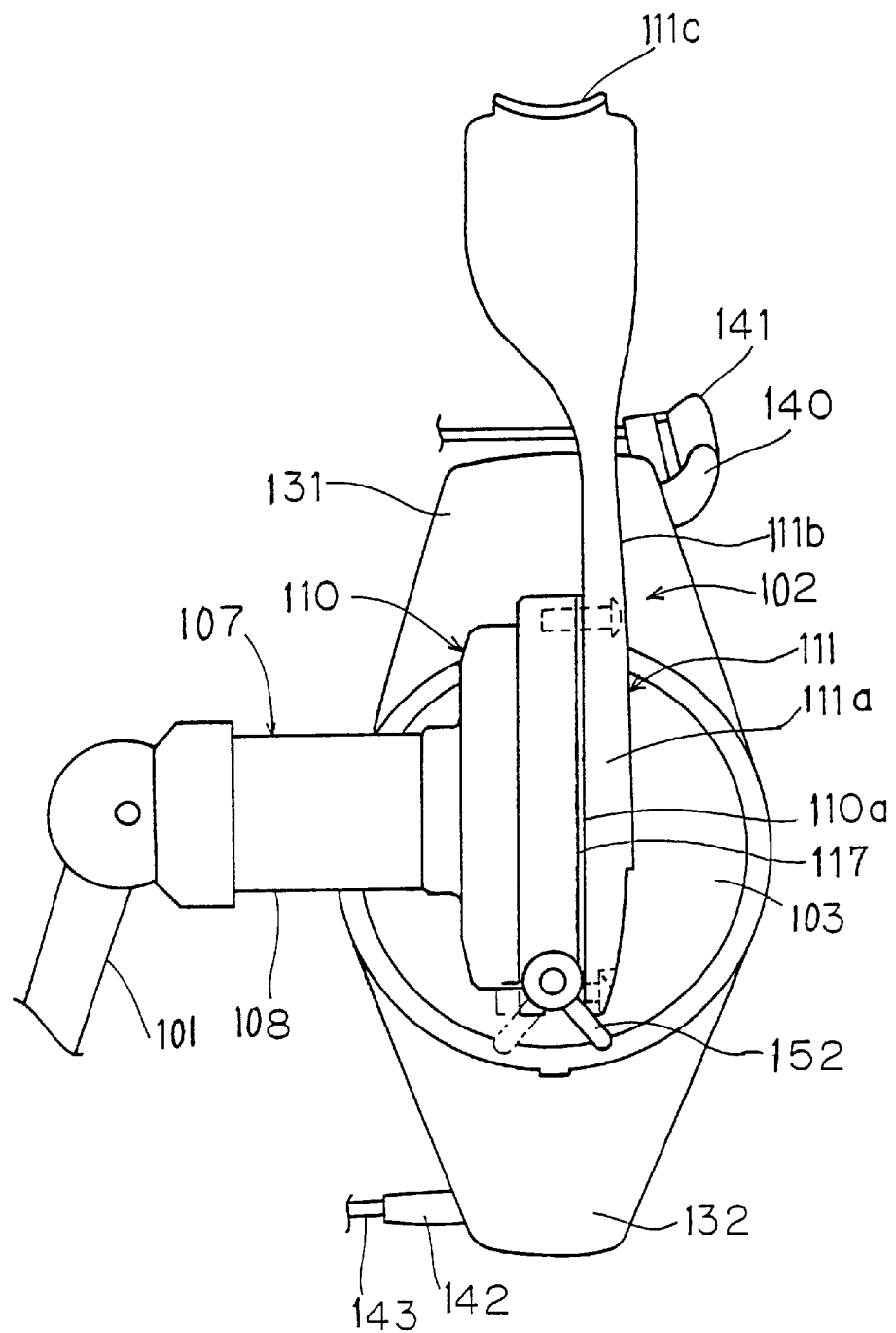
FIG. 10 is a rear elevational view of the spinning reel depicted in FIG. 8.

In FIGS. 8 to 10, a spinning reel is shown in accordance with a second embodiment of the present invention. The spinning reel includes a reel main body 102 rotatably supporting a handle 101, a rotor 103, and a spool 104. The rotor 103 is rotatably supported on the front portion of the reel main body 102. The spool 104 is configured to receive a fishing line onto the outer circumferential surface thereof in response to rotation of the rotor 103. The spool 104 is also configured for movement on the front portion of the rotor 103 in forward and backward directions along an axis of rotation of the rotor 103.

The reel main body 102 includes a casing portion 110 supporting the rotor 103 and the spool 104, and a lid portion 111 removably attached via screws to the casing portion 110. The casing portion 110 is a thin magnesium-alloy member obtained, for instance, by an injection molding in accordance with a Thixomolding™ process, such as that referred to above with respect to the first embodiment. Provided inside the casing portion 110 are a rotor drive mechanism 105 for rotating the rotor 103, an oscillating mechanism 106 for uniformly winding up the fishing line by moving the spool 104 in forward and backward directions, and a handle supporting portion 107 for rotatably supporting the handle 101.

The lid portion 111 is a member made of, for instance, titanium or alloys thereof and manufactured by a lost-wax process (also known as a precision-casting process). The lid portion 111 has a thin cover portion 111a for covering an opening 110a of the casing portion 110, and a mounting leg portion 111b extending upwardly from the cover portion 111a. The surface side and the reverse side of the cover portion 111a are made substantially smooth. The mounting leg portion 111b is a solid thick member, and its distal end extends in both front and rear directions to form a fishing rod mounting portion 111c.

An insulating sheet 117 made of, for instance, a synthetic resin such as nylon or the like is interposed between the casing portion 110 and the lid portion 111. The casing portion 110 and the lid portion 111 made of metals having incompatible ionization characteristics and therefore should not be in direct contact with one another. By interposing the insulating sheet 117 between the casing portion 110 and lid portion, the flow of electrons between the casing portion 110 and the lid portion 111 can be remarkably reduced to make it difficult for electrolytic corrosion on the magnesium-alloy-made casing portion 110 to occur.

The rotor drive mechanism 105 includes a handle shaft 112 to which a handle 101 is connected, a master gear 113 formed integrally on the distal end of the handle shaft 112, and a pinion gear 114 meshing with the master gear 113. The handle shaft 112 is rotatably supported onto the handle supporting portion 107. The pinion gear 114 is formed cylindrically, and its front portion 114a penetrates the central portion of the rotor 103 to extend toward the spool 104. Its distal end is formed with a thread portion. The axially intermediate portion and rear end portion of the pinion gear 114 are rotatably supported through bearings 115 and 116, respectively, onto the casing portion 110 of the reel main body 102.

The oscillating mechanism 106 is a mechanism for moving the spool shaft 120 fixed to the central portion of the spool 104 in the back-and-forth direction to thereby moving the spool 104 in the same direction. The spool shaft 120 is made of, for instance, a stainless steel, and is axially movable in forward and backward directions and supported through a pinion gear 114 onto the reel main body 102. The oscillating mechanism 106 includes a threaded shaft 121 disposed above the spool shaft 120, a slider 122 moved along the threaded shaft 121 in forward and backward directions, and an intermediate gear 123 fixed to the distal end of the threaded shaft 121. The threaded shaft 121 is arranged in parallel to the spool shaft 120, and rotatably supported onto the casing portion 110. A spiral groove 121a is formed in the outer circumferential portion of the threaded shaft 121. The slider 122 is slidably mounted on a guide shaft 124 disposed above and in parallel to the threaded shaft 121. The rear end of the spool shaft 120 is fixed to the slider 122. The intermediate gear 123 meshes with the pinion gear 114.

The handle supporting portion 107 includes a support cylinder 108 provided in the casing portion 110, and two bearings 109 located within the support cylinder 108 to be distanced from each other in the axial direction of the handle shaft 112 and rotatably supporting the handle shaft 112. The support cylinder 108 is elongated outwardly in a direction perpendicular to the spool shaft 120 in the casing portion 110.

The rotor 103 includes a circular cylindrical portion 130, and a first rotor arm 131 and a second rotor arm 132 which are provided on the sides of the circular cylindrical portion 130 opposite each other. The circular cylindrical portion 130, and the both of rotor arms 131 and 132 are formed by an integrally molded member made of, for instance, an aluminum alloy.

A front wall 133 is formed in the front portion of the circular cylindrical portion 130, and a boss 133*a* is formed at the central portion of the front wall 133. The front portion 114*a* of the pinion gear 114 and the spool shaft 120 penetrate a through-hole of this boss portion 133*a*. On the front side of the front wall 133, there is disposed a nut 134. This nut 134 is engaged via screw type threads with the threaded portion on the distal end of the pinion gear 114. A bearing 135 rotatably supporting the spool shaft 120 is arranged on the inner circumferential portion of the nut 134.

A first line engaging preventive member 136 of a circular cylinder axially having a pair of slits is provided on the front wall 133 of the rotor 103. This first line engaging preventive member 136 is a member for preventing a fishing line wound onto the spool 104 from entering through a clearance between the spool 104 and the rotor 103 and engaging around the spool shaft 120. Inside the spool 104, and between the spool 104 and the rotor 103, a second line engaging preventive member 137 is provided for preventing the fishing line wound onto the spool 104 from entering into the inside through a clearance to the rotor 103. The second line engaging preventive member 137 is a pot-shaped member, which is formed at its front portion with a pair of arcuate through-holes 137*a* through which the first line engaging preventive member 136 passes. A bearing 138 is arranged at the central portion of the second line engaging preventive member 137 to rotatably support the spool shaft 120. Provided on the circumferential edge portion of the second line engaging preventive member 137 are a cylindrical portion 137*b* for closing a clearance between the rear end portion of the spool 104 and the rotor 103, and a pair of rotor retaining portions 139*a* and 139*b* extending outwardly from the cylindrical portion 137*b*. The rotor retaining portions 139*a* and 139*b* are respectively retained on the pair of rotor arms 131 and 132 so as to rotate the second line engaging preventive member 137 in linking with the rotor 103.

A first bail support member 140 is swingably mounted on the inner circumferential side of the distal end of the first rotor arm 131. The first bail support member 140 is rotatably supported onto the first rotor arm 131 through two bearings 140*a*. A line roller 141 for guiding a fishing line to the spool 104 is mounted on the distal end of the first bail support member 140. A second bail support member 142 is swingably mounted onto the inner circumferential side of the distal end of the second rotor arm 132. This second bail support member 142 can be made of, for instance, a material having a specific gravity larger than other portions so as to serve as a balancer for correcting the rotational imbalance caused by the second bail support member 140 and the line roller 141. A bail 143 is provided between the line roller 141 on the distal end of the first bail support member 140, and the second bail support member 142. A bail arm 145 is defined by the bail support members 140 and 142, line roller 141 and bail 143. By mounting the bail support members 140 and 142 onto the inner circumferential sides of the rotor arms 131 and 132, respectively, the radius of rotation of the bail arm 145 can be made small so as to avoid the interference with a hand holding a fishing rod. Thus, the mounting leg portion 11*b* can be made short to make the spool 104 and the fishing rod close to each other, thereby making the entire size small.

Here, both of the bail support members 140 and 142 are swingable about a swinging axis M. If a point at which the swing axis M intersects the first bail support member mounting surface of the first rotor arm 131 is expressed as a swinging center C1, and a point at which the swing axis M intersects the second bail support member mounting surface of the second rotor arm 132 is expressed as a swinging center C2, then the swinging center C2 is located at a more forward position than the swinging center C1 is. That is, the swing axis M is inclined rearward with respect to an axis orthogonal to the spool shaft 120. Further, the bail support members 140 and 142 are arranged so that their swinging surfaces are orthogonal to the swing axis M.

A reversal preventive mechanism 150 for the rotor 130 is arranged within the circular cylindrical portion 130 of the rotor 103. The reversal preventive mechanism 150 includes a roller type one-way clutch (not shown), and an operating mechanism 151 for switching the one-way clutch between an activated condition and a non-activated condition. The one-way clutch is arranged so that its outer race is fixed to the casing portion 110 and its inner race is fixed to the pinion gear 114. The operating mechanism 151 has an operation lever 152 disposed at the lower portion of the casing portion 110, and by swinging the operation lever 152, the one-way clutch can be switched between the two conditions. Under the activated condition the rotor 103 is prohibited from rotating in a reverse (non-winding) direction, whereas under the non-activated condition the rotor 103 is permitted to rotate in the reverse direction.

The spool 104 is disposed between the first rotor arm 131 and the second rotor arm 132 of the rotor 103, and fixed to the distal end of the spool shaft 120 through a sleeve 104*d* made of an aluminum. The spool 104 has a line winding barrel portion 104*a*. The fishing line is wound onto an outer circumference of the line winding barrel portion 104*a* of the spool 104. A rear flange portion 104*b* of the spool 104 is formed rearward from the line winding barrel portion 104*a*, and an aluminum-made front flange portion 104*c* fixed to the front portion of the line winding barrel portion 104*a*. The line winding barrel portion 104*a* and the rear flange portion 104*b* are formed of a thin member, are formed integrally with one another and are made of a magnesium alloy. The line winding barrel portion 104*a* extends up to the outer circumferential side of the circular cylindrical portion 130 of the rotor 103 so that its barrel length is longer than that of a general spinning reel. The diameter of each of the flange portions 104*b* and 104*c* are smaller than those of the general spinning reel. By this arrangement, the resistance during the line feeding can be made small, and the line twists are prevented even if a thinner fishing line is wound onto the line winding barrel portion 104*a*.

Next, the operation of the spinning reel will be described.

For casting with the spinning reel, the bail 143 is pivoted from a line winding side to a line releasing side. This causes the first and second bail support members 140 and 142 to be rotated in the same direction about the swing axis M. In this operation, since the first and second bail support members 140 and 142 are disposed on the inner circumferential sides of the first and second rotor arms 131 and 132 and the swing axis M is inclined rearward with respect to the spool shaft 120, the bail support member 140 and the line roller 141 on the distal end thereof are moved more radially inwardly than those at the line winding position. Therefore, the line being fed during the casting is hardly entangled onto the first bail support member 140 and the line roller 141.

For the line winding operation, the bail 143 is returned to the line winding position. This can be automatically done with the action of a not-shown cam and spring when the handle 101 is rotated in the line winding direction. When the handle 101 is rotated in the line winding direction, the rotational torque is transmitted through the handle shaft 112 and the master gear 113 to the pinion gear 114. The rotational torque transmitted to the pinion gear 114 is transmitted through the front portion of the pinion gear 114 to the rotor 103 so that the rotor 103 is rotated in the line winding-up direction.

On the other hand, by the intermediate gear 123 meshing with the pinion gear 114, the threaded shaft 121 is rotated so that the slider 122 engaged with the spiral groove 121a of the threaded shaft 121 is moved back-and-forth direction while being guided by the guide shaft 124. Therefore, the spool shaft 120 and the spool 104 reciprocate back-and-forth so that the fishing line guided by the bail 143 and the line roller 141 onto the spool 104 is wound up onto the outer circumferential surface of the line winding barrel portion 104a of the spool 104 uniformly.

In the spinning reel thus constructed, since a portion of the reel main body 102 and the spool 104 are made of the magnesium alloys, the similar effect can be obtained as in the first embodiment. Further, since the titanium-alloy-made thick mounting leg portion 111b is formed integrally with the cover portion 111a, and the magnesium-alloy-made thin casing portion 110 for accommodating drive parts therein is formed separately from the mounting leg portion 111b, the high accuracy of the casing portion 110 can be maintained and the rigidity thereof can be increased. The mounting leg portion 111b is also maintained in strength. Since the mounting leg portion 111b is made integral with the cover portion 111a, the strength can be maintained with a simple structure in comparison with prior art configurations where they are separate members.

Embodiment 3

Figure 11:
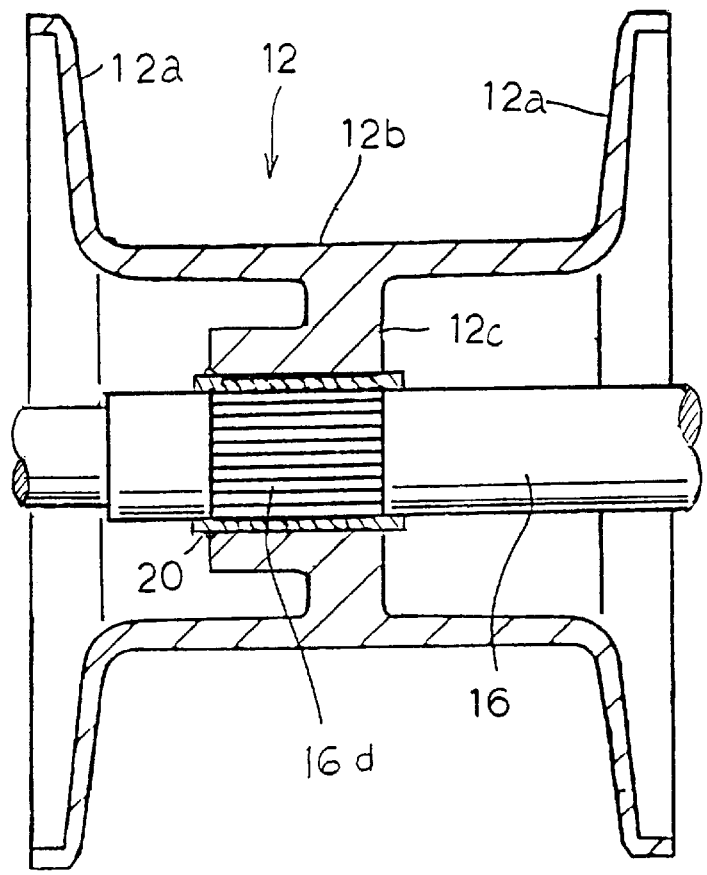
FIG. 11 is a fragmentary cross-sectional view of a double bearing reel in accordance with a third view of the present invention.

In FIG. 11, a spool 12 is a magnesium-alloy-made member obtained by injection molding in accordance with a die-casting process. The spool 12 has dish-like flange portions 12a at both sides thereof, and a cylindrical line winding barrel portion 12b between the flanges 12a. The spool 12 has an integral hollow boss portion 12c at a substantially central portion in the axial direction and the inner circumferential side of the line winding barrel portion 12b. A sleeve made of an aluminum alloy is pressure-inserted into the inner circumferential side of the boss portion 12c. The sleeve 20 is interposed so as to prevent the electrolytic corrosion of the spool 12 made of a magnesium alloy. The spool 12 is non-rotatably fixed with respect to a spool shaft 16 passing through the sleeve 20, for instance, by a serration connection. A manner of fixing is not limited to fixing method that employs recesses and protrusions of the serration connection or the like, and various connection methods such as adhesion, insertion molding, or the like are employable.

Figure 12:
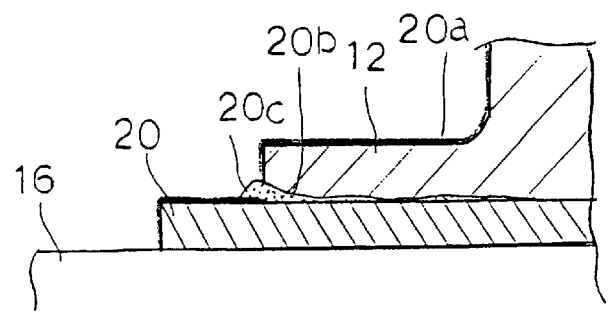
FIG. 12 is fragmentary cross-section of a portion of the reel depicted in FIG. 11, on an enlarged scale.

As shown in FIG. 12, a metal oxide film 20a is formed on the surfaces of the spool 12 and the sleeve 20 to enhance the anti-corrosion property thereof. The metal oxide film 20a is formed by an anodic oxidation process or a conversion coating process. A slight clearance 20b exists between the spool 12 and the sleeve 20. An adhesive agent 20c injected by a capillary phenomenon fills the clearance 20b. The liquid to be filled is not limited to the adhesive 20a, and any liquid can be used as long as the liquid is excellent in permeability and anti-corrosion property such as a synthetic resin, an oil or the like.

The spool shaft 16 is a bar-like member made, for instance, of a stainless steel.

To avoid the electrolytic corrosion, the sleeve 20 is disposed between the magnesium alloy and the stainless steel. The sleeve is made of the aluminum alloy having generally neutral ionization characteristics with respect to the magnesium alloy and the stainless steel. The interposing manner is not limited to the pressure insertion. Insertion molding methods are applicable. If a clearance 20 remains between the spool 12 and the sleeve 20, atmospheric air, salt water or the like is likely to enter into the clearance 20b, which may lead to corrosion. To eliminate a possibility of the corrosion, the adhesive agent 20c is filled into this clearance 20b.

Embodiment 4

Figure 13:
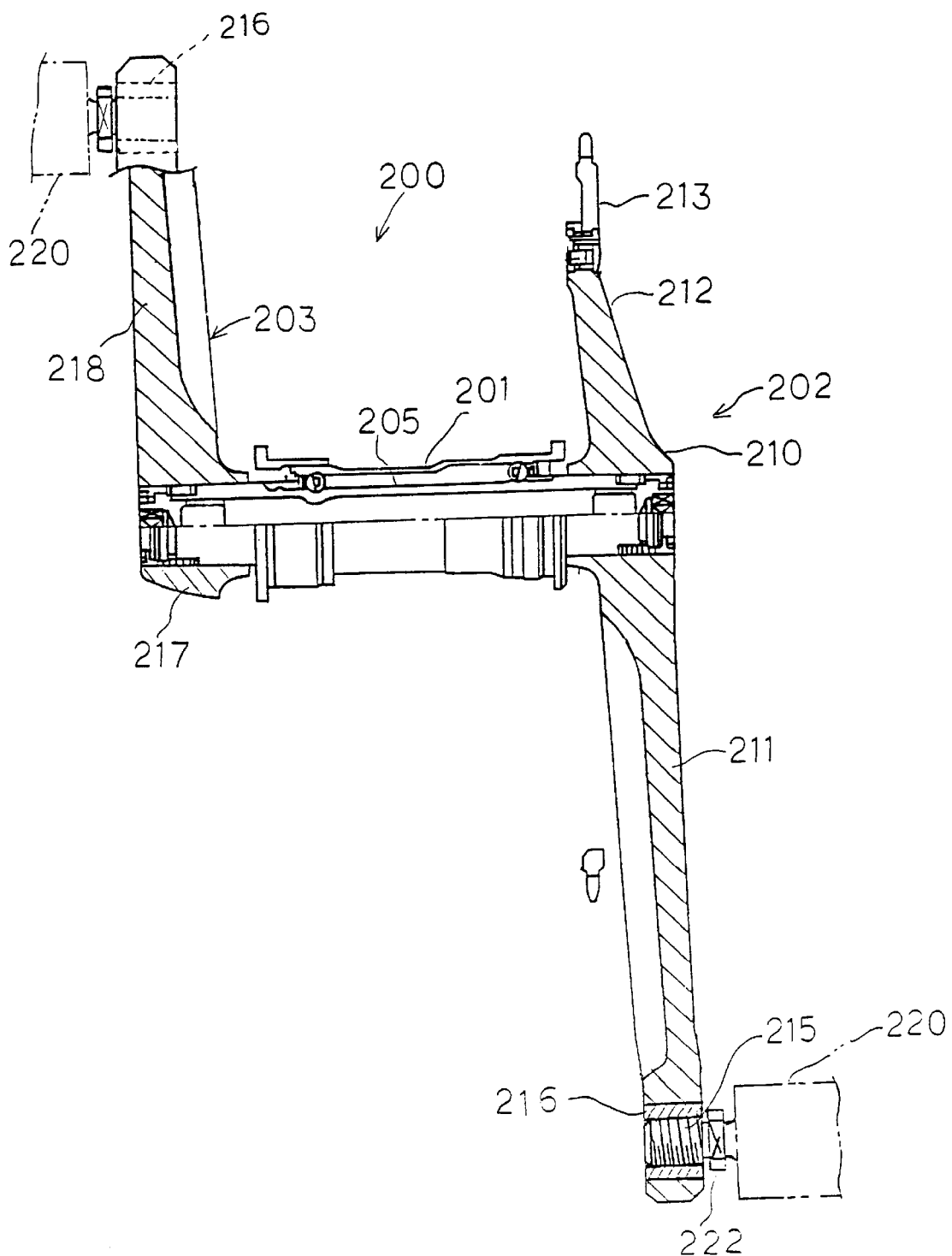
FIG. 13 is a fragmentary, cross-sectional view of a bicycle crank assembly in accordance with a fourth embodiment of the present invention.

In FIG. 13, a crank assembly 200 for a bicycle includes a right crank arm 202 and a left crank arm 203 which are non-rotatably fixed to the ends of an aluminum-alloy-made crank shaft 205, respectively. The crank shaft 205 is rotatably supported onto a bottom bracket 201 mounted on a bicycle frame (not shown).

Figure 14:
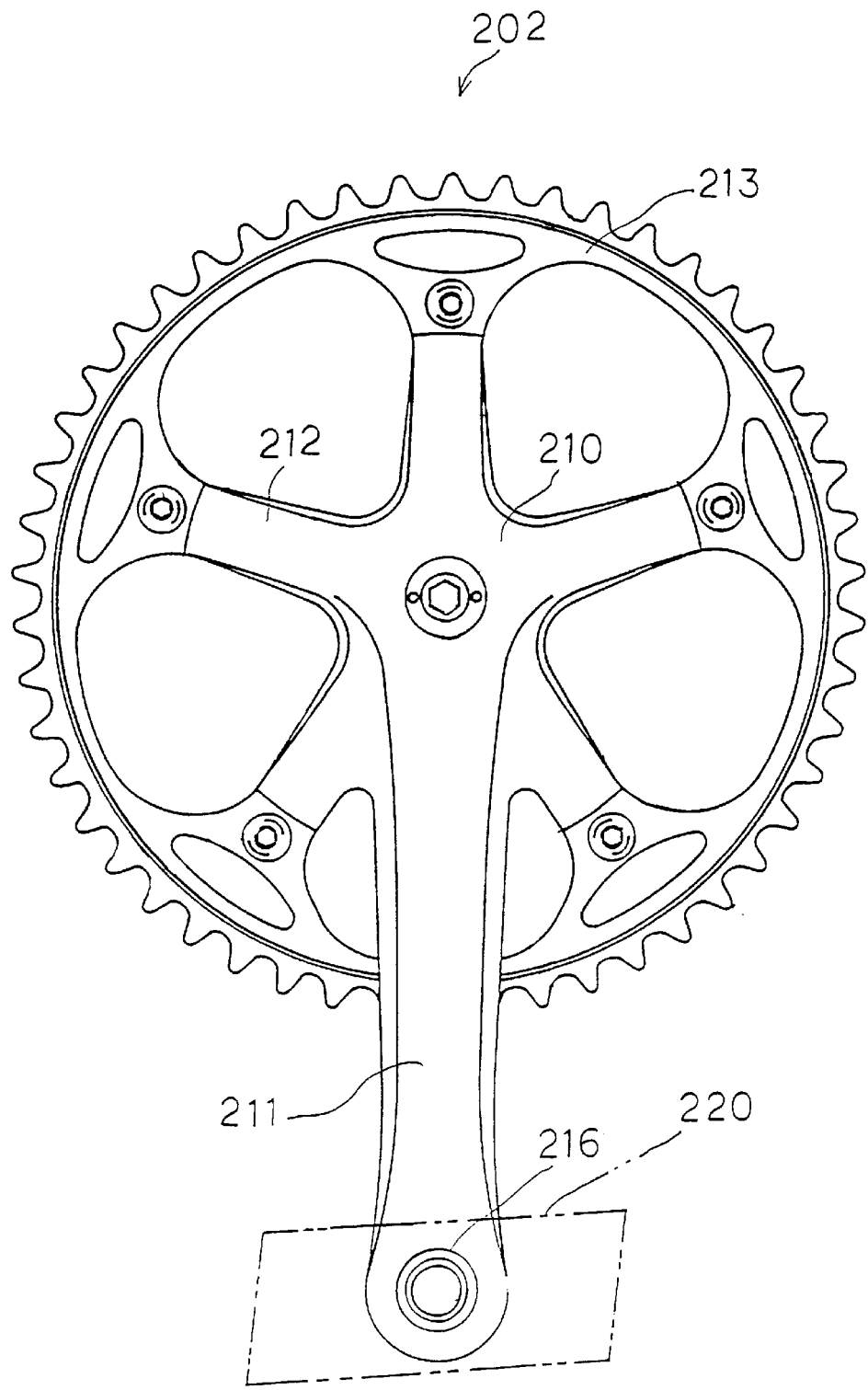
FIG. 14 is a side view of a right crank arm of the bicycle crank assembly depicted in FIG. 13.

As shown in FIG. 14, the right crank arm 202 includes a boss portion 210 fixed to the crank shaft 205, a crank portion 211 extending radially outwardly from the boss portion 210, and five connecting fingers 212 extending radially outwardly from the boss portion 210. The connecting fingers 212 are arranged at substantially constant angular intervals, and the crank portion 211 extends from a portion between the two connection fingers 212. A sprocket 213 is removably mounted onto these connection fingers 212 by bolts.

The right crank arm 202 is made of magnesium alloy. A stainless-steel-made pedal shaft 222 for a pedal 220 is attached to the distal end of the crank portion 211. For attachment, a threaded hole 215 is provided in the distal end of the crankshaft 211. The threaded hole 215 is formed on an aluminum-alloy-made sleeve 216 non-rotatably pressure-inserted into the distal end of the crankshaft 211.

An adhesive agent is similarly filled into a clearance between the sleeve 216 and the distal end of the crankshaft 211. A metal oxide film is formed on the surface of the right crank arm 202.

As shown in FIG. 13, the left crank arm 203 includes a boss portion 217, and a crank portion 218 extending radially outwardly from the boss portion 213. An aluminum-alloy-made sleeve 216 is pressure-inserted into the distal end of the crank portion 218 similarly.

In the part assembly for a bicycle, the crank arms 202 and 203 are not likely to be electrolytically corroded with the magnesium-alloy-made crank shafts 202 and 203 mounted onto the stainless-steel-made pedal shaft 222. Further, since the adhesive agent is filled into the clearance between the sleeve 216 and each of the crank portions 211 and 218, the corrosion is not likely initiated from that clearance.

Other Embodiments (a) The arrangement of the part assembly for a fishing reel is not limited to the aforementioned embodiments. The assembly according to the present invention can be applied to other fishing reels such as a lever-drag type or electrically driven type double bearing type reel, a spinning reel having a drag mechanism or a braking mechanism having a brake lever in place or reversal preventive mechanism, and a one-sided bearing reel.

(b) In Embodiment 2 described above, the cover portion and the mounting leg portion are integrally formed together. The present invention can be applied to a spinning reel in which the casing portion and the mounting leg portion are integrally formed together.

(c) In the foregoing embodiments, the material of the sleeve is the aluminum alloy. The material of the sleeve is not limited to the aluminum alloy, and the sleeve can be made of any metal, such as a zinc alloy or the like, that has ionization characteristics compatible with the magnesium.

(d) In the foregoing embodiments, since the spool shaft is made of the stainless steel, the sleeve is interposed between the spool and the spool shaft. If the spool shaft is made of an aluminum alloy or a zinc alloy, the spool may be directly mounted onto the spool without the sleeve since the ionization characteristics are generally compatible with those of the spool.

(e) Although the first part (the spool or the reel main body) made of the magnesium alloy is manufactured by the injection molding in accordance with the Thixomolding™ process in the aforementioned embodiments, the parts may be manufactured by a die-casting process. In this case, the first part can be manufactured inexpensively compared to the Thixomolding™ process.

(f) Although a synthetic resin is described as an example of the insulating member in the aforementioned embodiments, any other synthetic resin, or an insulating ceramics such as an aluminum oxide may be used as a material of the insulating member. In the case where the second part and the third part are made of an aluminum alloy, a metal oxide film may be formed on the contacting surface of the first member as the insulating member. Further, the insulating third member may be formed by insulating paint or the like.

(g) In Embodiment 4 described above, a crank assembly is described as an example of the part assembly for a bicycle. The present invention should not be restricted thereto, and can be applied to other part assemblies for a bicycle, including a brake device such as a brake lever, a brake arm or the like, and a gear change mechanism such as a front derailleur, a rear derailleur or the like.

Effects of the Invention

As described above, according to the present invention, a first part made of an magnesium alloy is in contact with a second part made of an aluminum alloy. Since aluminum has ionization characteristics that are generally compatible with magnesium, electrolytic corrosion is unlikely to occur even though these parts are directly contact each other.

Further, in a case where a filling agent is inserted into a clearance between the first and the second parts or the first part and a third part, air, ambient corrosive fluids such as a sea water or the like are prevented from entering into the clearance, so that the corrosion hardly occurs from that portion. Thus, anti-corrosion property can be improved further.

What is claimed is:

1. A lightweight rotary mechanical assembly having rigidity to sustain human-powered rotation, the mechanical assembly comprising:

a magnesium alloy rotary part;

a contact part connected to said rotary part, said contact part made from one selected from the group consisting of aluminum alloys, zinc alloys, titanium and titanium alloys, therein having a lower ionization energy than said magnesium alloy rotary part; and a metal oxide film formed on said contact part for direct contact with said rotary part, for electrolytic insulation between said contact part and said rotary part.

2. The mechanical assembly as set forth in claim 1, wherein said contact part is a cylindrical sleeve, and said mechanical assembly further comprises a stainless steel rotary shaft fitted into said rotary part with said cylindrical sleeve interposed therebetween.

3. The mechanical assembly as set forth in claim 2, wherein said rotary part is a line-winding spool for a fishing reel, and said rotary shaft is for said line-winding spool.

4. The mechanical assembly as set forth in claim 3, wherein said line-winding spool and said rotary shafts are components of a double-bearing reel.

5. The mechanical assembly as set forth in claim 2, wherein said rotary part and said rotary shaft form a bicycle part.

6. The mechanical assembly as set forth in claim 5, wherein said bicycle part is a crank assembly.

7. The mechanical assembly as set forth in claim 1, wherein said rotary part is formed by an injection molding process.

8. The mechanical assembly as set forth in claim 1, wherein said rotary part is formed using a die-casting molding process.

9. The mechanical assembly as set forth in claim 1, further comprising a filling agent inserted between said rotary part and said contact part.

10. The mechanical assembly as set forth in claim 9, wherein said filling agent is a liquid for capillary injection.

11. The mechanical assembly as set forth in claim 10, wherein said filling agent is a liquified adhesive agent for solidifying after insertion.

12. The mechanical assembly as set forth claim 1, wherein said rotary part is a rotor-supporting casing for a spinning reel main body, and said contact part is a lid section removably attached to said casing.

13. The mechanical assembly as set forth in claim 1, wherein said magnesium alloy rotary part is aniodized.

* * * * *